Feb. 28, 1967      H. WEISTE      3,306,630
ARRANGEMENT FOR COUPLING A TOWED VEHICLE TO A TOWING VEHICLE
Filed March 4, 1965                           2 Sheets-Sheet 1

Inventor
HEINRICH WEISTE

By Cushman, Darby & Cushman
ATTORNEYS

United States Patent Office 3,306,630
Patented Feb. 28, 1967

3,306,630
ARRANGEMENT FOR COUPLING A TOWED
VEHICLE TO A TOWING VEHICLE
Heinrich Weiste, 4771 Sieningsen, Sost,
Westphalia, Germany
Filed Mar. 4, 1965, Ser. No. 437,054
Claims priority, application Germany, Mar. 9, 1964,
W 36,346; June 1, 1964, W 36,894
9 Claims. (Cl. 280—479)

The present invention relates to an improved automatic catch coupling arrangement for coupling a towed vehicle or agricultural appliance to a towing vehicle. More especially, this invention relates to an improved catch coupling arrangement for connecting towable agricultural implements to a tractor. The invention is particularly concerned with tractors provided with, or modified to have, a three point power lift, power takeoff, or three point hydraulic linkage, as these applicances are variously named in the art.

Mechanization on the farm has brought its problems, and where they were least expected, for example in the coupling or hitching of mounted implements. As every farmer knows, the fitting of tractor-mounted implements has become increasingly difficult. This problem had never arisen during the time that relatively light implements were in use, mounted on small tractors. In the last few years however, the number of large tractors on the farm has increased enormously and implements in consequence, have become larger and heavier.

The result of this is that the coupling-up of mounted implements has become more and more difficult, and the problems become more vexing. Thus, it frequently happens that the implement tilts on being unhitched. This makes subsequent coupling difficult since with the existing three-point linkage, both tractor and implement must be properly aligned before mounting. Manual attempts to lift a heavy implement from an awkward position can of course lead to injury, which should desirably be avoided. Increasing interest has thus occurred in the concept of "implement change from the tractor seat."

The agricultural engineering industry has recognized this need in the art and various hook-type couplings have been developed for use with the three-point linkage. This too has produced problems because hitching with a hook-type system is a precision operation, and because in many cases it is impractical to leave the implement level or in a suitable position for remounting by the tractor.

In one known device for example, the tractor power lift has been provided with a triangle shaped or A-frame member fabricated from bar or strap material and provided with a hook at its apex, and two or more hooks on the base of the member, and all of the hooks are adapted to be engaged by corresponding members of a coupling element on the desired agricultural implement. Coupling-up with this device may be difficult however, since, especially if the ground is uneven, it is not always possible for the hooks of the power lift to engage below the matching members of the coupling element on the appliance, special skill being required for this purpose.

There can be little doubt that the agricultural industry has demonstrated a need for improvements in the coupling of implements to tractors having three-point hydraulic linkages since the known three-hook type of coupling hardly fulfills the demand for a foolproof system of implement hitching or coupling.

It is therefore a principal object of this invention to provide an improved automatic catch coupling for three-point hydraulic linkages, as well as a method for its use.

It is another object of this invention to provide an improved catch coupling arrangement that will obviate the difficulties encountered with presently known couplings, for example, those of the hook variety.

It is a further object of this invention to provide an automatic catch coupling arrangement that will obviate the need for hook couplings, and yet provide positive coupling to even those implements that are not disposed on a horizontal keel.

It is still a further object of this invention to provide an improved catch coupling system that can be automatically employed by a single operator.

Other and further objects of this invention, together with an appreciation for the advantages thereof, will become increasingly apparent as this description proceeds.

Broadly stated, the foregoing needs are satisfied, the objects of this invention are achieved, the foregoing difficulties are overcome, and important advantages are realized according to the invention by providing an arrangement for coupling a towed vehicle to a towing vehicle in which the towing vehicle has a three-point power lift, wherein a coupling member on the towing vehicle comprises a pair of converging members fixed relative to each other, movable on the three-point power lift, and a coupling member on the towed vehicle comprises two converging members fixed relative to each other defining each a channel, the open sides of the channels facing each other, the arrangement being such that the converging members of the coupling element of the towing vehicle are movable in the direction of convergence of the converging members, to be engaged by the channels of the coupling member on the towed vehicle. There are several ways in which the coupling member on the towing vehicle can be resiliently and displaceably arranged on the top link. For instance, the top link can be telescopically extensible axially.

In realizing its objectives, the invention has provided a coupling system which is simple, effective, time-saving and exceedingly safe to use. In particular, coupling is carried out by one large triangle instead of three small hooks on three small pins. Moreover, the tractor operator does not have to back-up absolutely accurately onto the implement and even when there is a matter of about ten inches free play, the triangle will lock on securely. Thus hitching becomes surprisingly easy. Further, hitching from extreme angles is possible or simple even when the implement has been dropped on a bank or in an inaccessible position. The tractor triangle can also be attached to any front loader so that toolbars can be used in front of the tractor, thus eliminating the need for an additional steerage operator. It can even be used for the movement of implements and loading. Hence, the present automatic system is a true "one man system" and an important advance in the art by reason of providing the farmer with a significant solution to a very vexing problem.

The understanding of the invention will now be facilitated when reference is had to the accompanying drawings which show preferred embodiments of the invention, wherein the same or similar reference numerals have been used to denote similar parts in the several figures and wherein.

From practical experience, with hook type hitches, it has been found that the clearance at the point of coupling normally amounts to some 1¾ to 2⅛ inches, and it has been found that these points are difficult to engage owing to the limited clearance imposed by the locking hooks. Also, the top link hitching point on the implement may vary over a vertical distance of about seven inches.

It has further been found that for a coupling to have truly universal application, three individual locking points are essential and must be capable of adjustment to suit the implement, particularly in the attachment of implements disposed at an angle to the horizontal.

There is also the problem of how the thousands of existing implements already on the farm can be attached, which although equipped for three-point hydraulic hitch, lack a standard fitting. Because of this, it has been determined that a truly rapid hitch must include sufficient clearance for the power take off and yet reduce overhang length and weight. It is also extremely important that the connection be simple and rigid to reduce the number of wearing surfaces which can lead to inefficient operation, particularly with ploughs. Further, the design must allow for adjustments to the top link to provide for the correct line of draught.

Surprisingly, the present invention has satisfied all these demands with a truly universal coupling system that is of sturdy construction and substantially foolproof in operation.

Figure 1:
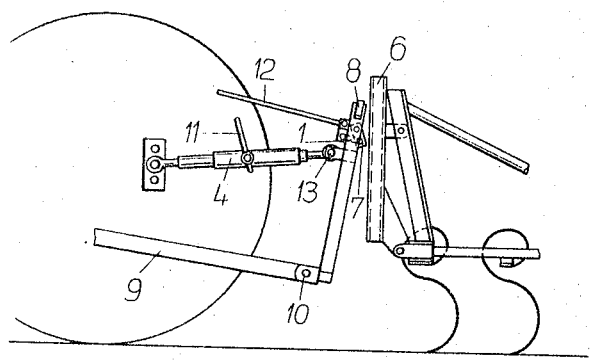
FIGURE 1 is a side elevation view showing a first embodiment of the invention connected to a suitable hydraulically extensible top link.
Figure 2:
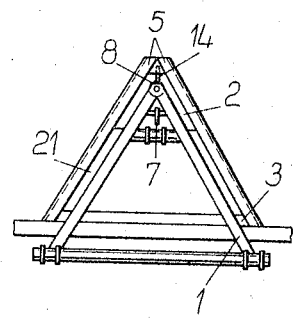
FIGURE 2 is a front elevation view of the coupling elements shown in FIGURE 1.

Turning now to the drawings, in the embodiment shown in FIGURES 1 and 2, an angle-frame 1 pivotally mounted on lower links 9 (only one being shown) at lugs 10 is connected to a point 13 of a hydraulically extensible top link 4 so as to be movable relative to a tractor to which both links 9 and 4 are pivotally connected. When the frame 1 is pivoted out and the tractor is driven backwards, the apex of the angle-frame 1, where there is a roller 8, comes up against a closed rear wall 21 of a coupling member 6 on an agricultural appliance and slides upwards along the wall 21, by this action raising the lower links, until the members of the frame 1 engage flush in the channel of U-section channel members 5 forming the coupling member 6. If the appliance is standing on a steep slope, the appliance is also lifted during this operation. The roller 8 at the apex of the frame 1 facilitates entry of the frame members into engagement with the coupling member, more particularly in cases where the appliance to be connected up to the tractor is in such a position as to be inclined in two planes. The roller 8 would then run in the opening of one of the two U-section members 5. When the frame 1 and coupling member 6 are in registration with one another, a nose-piece 7 on the frame latches into an aperture 14 in the rear wall 21. This connection, which operation of a draw member 12 can release, prevents the frame 1 appliance from falling from a normal position. A lever 11 can be operated to lock the extensible top link 4 at a given extension.

This embodiment can be used when the tractor has the coupling device according to the invention fitted to it as part of its original equipment. To fit an arrangement according to the invention to subsequently existing tractors and those not provided with a coupling device according to the invention, a rigid top link is provided with an intermediate member connected to it so as to be resilient and axially movable, the apex of the coupling member being disposed on such intermediate member. Conveniently, the frame is guided in a slideway of the intermediate member, the slideway having a catch zone which locks the member when the same is vertical.

Figure 3:
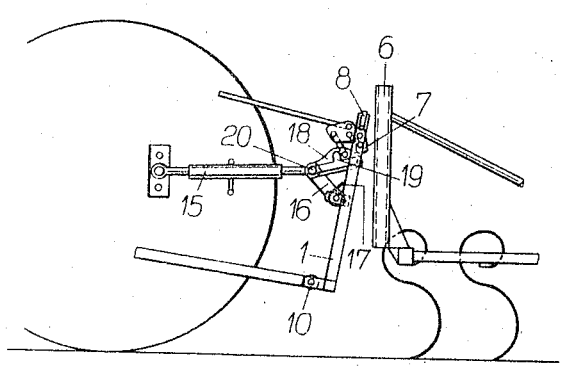
FIGURE 3 is a side elevation view of a second embodiment of the invention which can be connected to an intermediate member mounted on the top link.
Figure 4:
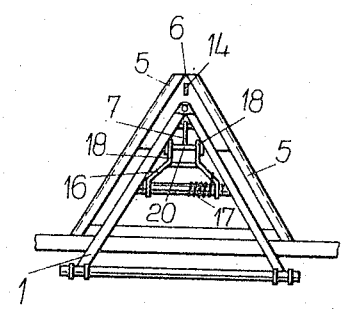
FIGURE 4 is a front elevation view of the coupling elements in FIGURE 3.

Such an arrangement is shown in FIGURES 3 and 4 wherein a nonextensible top link 15 is provided with an intermediate member 16, the same being resiliently pivoted to the frame 1 and resiliently loaded by means of a spring 17. The upper end of the frame 1 has a pin 20 passing through and mounted for displacement in, a slideway 18 comprising a catch portion 19. Although square metal bars have been used in the drawings for the frame of that coupling element on the tractor, and although U-section channel members have been used for the coupling element on the appliance, it will be understood that other shapes of such bars or members may be used.

Figure 5:
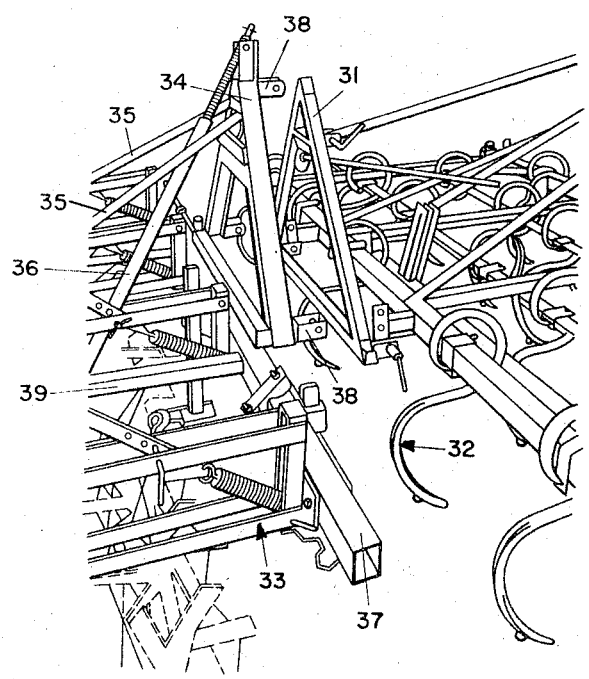
FIGURE 5 is a perspective view of still another embodiment according to the invention.

According to the invention, a second agricultural appliance can be similarly coupled to the first appliance. One way of doing this is shown in FIGURE 5 depicting an embodiment of the invention as applied to a combination of appliances formed, for example, from a Danish cultivator and a clod breaker.

In this embodiment, an angle-frame 31 corresponding to the coupling member 1 is mounted at the back of a Danish cultivator 32 and a matching coupling element 34 is mounted on a clod breaker 33. The matching coupling element 34 is mounted on a front beam 37 of a frame 39 of the clod breaker 33 and serves as a support member for frame strutting 35, an adjusting spindle 36 and take-up devices 38 for possible direct connection to the tractor power lift.

This arrangement greatly improves the stability of the second appliance during hitching and unhitching, since the force applied by the first coupling element is distributed uniformly. There is also a considerable weight economy since no special supporting and retaining blocks or the like are required. Very advantageously, the front beam of the second appliance frame is a square-section tube.

The coupling system according to the invention thus provides for the easy hitching of such implements as: cultivators; crumblers; ploughs; rotary cultivators; various harrows; fertilizer distributors; planters; feed disks; makers; platforms; fertilizer row distributors; feed disks with feed claws, hoppers, and/or feed fingers; row planters; potato planters variously equipped; ridgers; weeders; drill seeders; steerage hoes; and the like, as well as various combinations of these devices as are known in the art.

From the foregoing description and drawings, it will be realized that the invention provides a vastly improved coupling device which consists of the triangle on the tractor and the triangle on the implement. When coupling up, these slide one within the other and form a perfect, simple and safe connection. By use of the adjustable top link, the equipment can be hitched quickly and simply from difficult positions with angles of up to 15–20° in all directions. The triangular layout of the coupling system enables the tractor driver to mount and release the largest and heaviest machinery or combination of implements no matter what the position.

The triangle device of the present invention may be provided as an integral part of the implement or the appropriate triangle can be bolted or welded on other makes of tractors and implements otherwise manufactured. Using this coupling, the tractor and the desired combination of implements can easily be coupled up from the tractor seat. Furthermore, the implements can be adjusted while in use.

It will be apparent that the invention is susceptible to various changes that will become apparent to those skilled in the art, and accordingly, the invention should only be limited by the following claims.

What I claim is:

1. In an arrangement for coupling a towed vehicle to a towing vehicle in which the towing vehicle has a three-point power lift, and wherein a coupling member on the towing vehicle comprises a pair of converging members fixed relative to each other and movable on the three-point power lift, the improvement comprising a coupling member on the towed vehicle having two converging members fixed relative to each other to receive the coupling member of the towing vehicle, the converging members of said towed vehicle having channels with open sides and with the open sides of the channels facing each other, and said coupling member of the towing vehicle further having a roller means carried at the apex of the converging members, said roller means being of such a size as to be receivable in one of said channels for guiding said coupling members into engagement, the arrangement being such that the converging members of the coupling member of the towing vehicle are movable in the direction of the convergence of the converging members, to be engaged by the channels of the coupling member on the towed vehicle.

2. An arrangement according to claim 1 wherein a deflection member is provided in the coupling member on the towed vehicle.

3. An arrangement according to claim 2 wherein the deflection member is a plate joining the two converging members.

4. An arrangement according to claim 1 including an upper link on the three-point power lift, said upper link being a telescopically extensible link.

5. An arrangement according to claim 4 wherein the upper link is hydraulically extensible.

6. An arrangement according to claim 1 including an upper link on the three-point power lift, said upper link being a nonextensible link.

7. An arrangement according to claim 1 wherein the coupling element on the towed vehicle is mounted on a front beam of the vehicle frame.

8. An arrangement according to claim 7 wherein the converging members are supported by struts on the frame of the towed vehicle.

9. An arrangement according to claim 7 wherein the front beam of the frame of the towed vehicle is a square section tube.

References Cited by the Examiner

UNITED STATES PATENTS

| | | | |
|---|---|---|---|
| 2,658,438 | 11/1953 | Seng. | |
| 2,888,995 | 6/1959 | Sorensen | 172—272 |
| 3,029,092 | 4/1962 | Stuart | 280—277 |
| 3,065,977 | 11/1962 | Virtue et al. | 280—460 |
| 3,074,501 | 1/1963 | Lane et al. | 180—14 |
| 3,220,751 | 11/1965 | Tweedale | 280—479 X |

LEO FRIAGLIA, *Primary Examiner.*